Jan. 12, 1943.   F. V. BROWN   2,308,048
REMOTE CONTROL SYSTEM
Filed Oct. 2, 1941   4 Sheets-Sheet 1

INVENTOR
Francis V. Brown
BY
Sommers & Young
ATTORNEYS

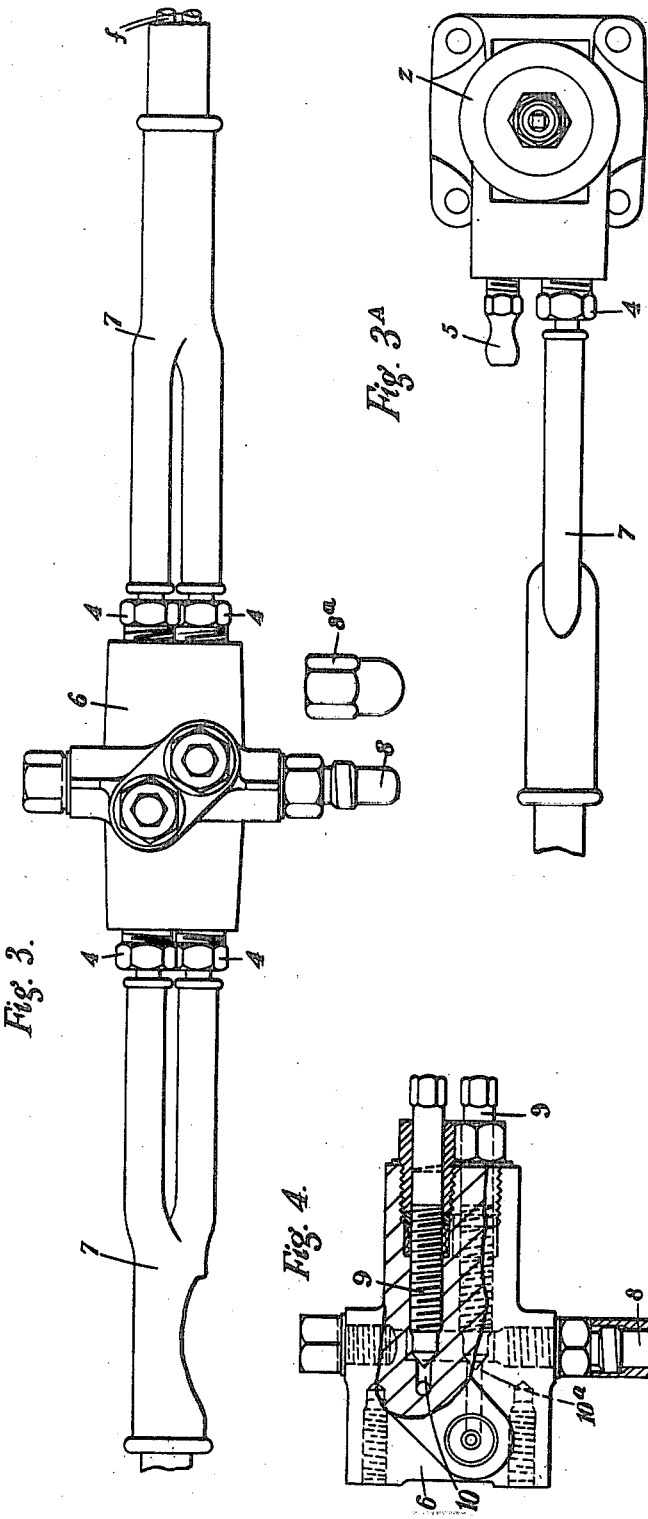

Jan. 12, 1943.  F. V. BROWN  2,308,048
REMOTE CONTROL SYSTEM
Filed Oct. 2, 1941   4 Sheets-Sheet 4
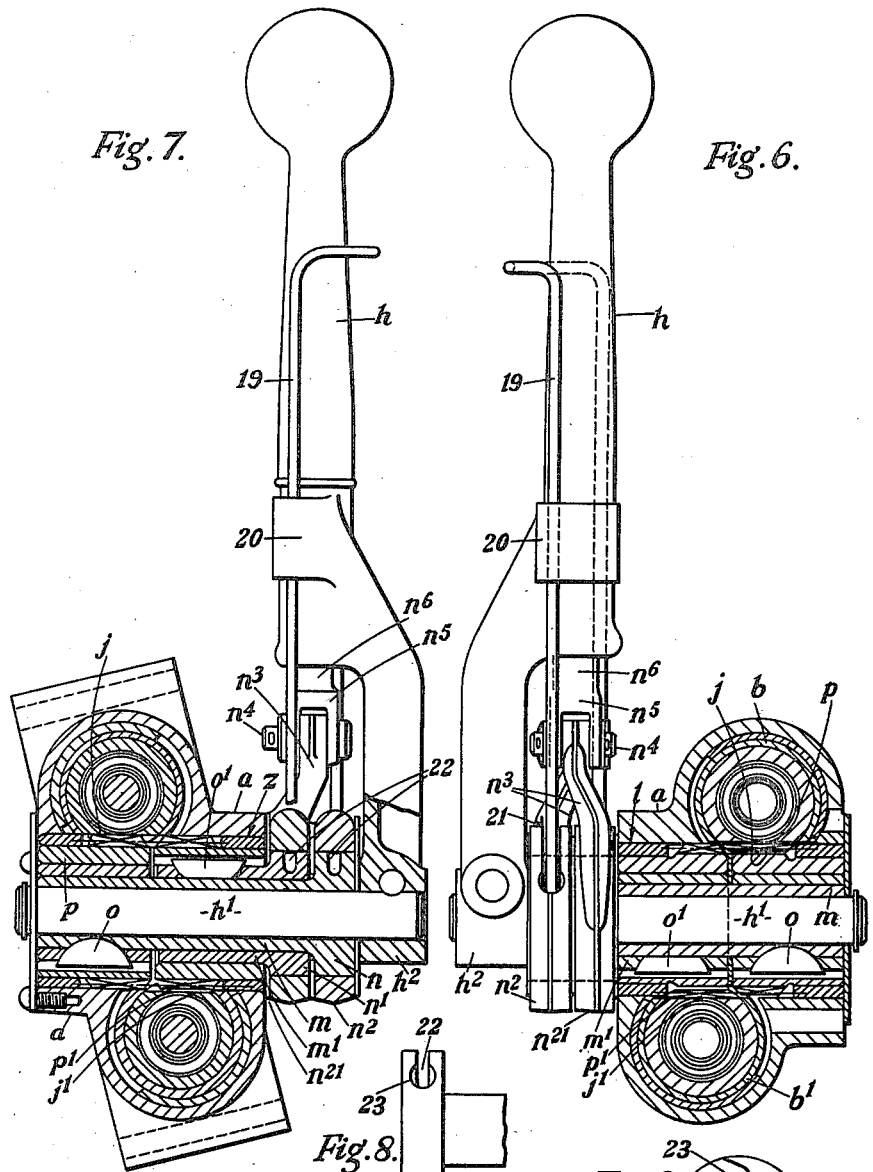
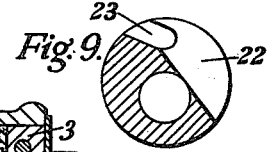
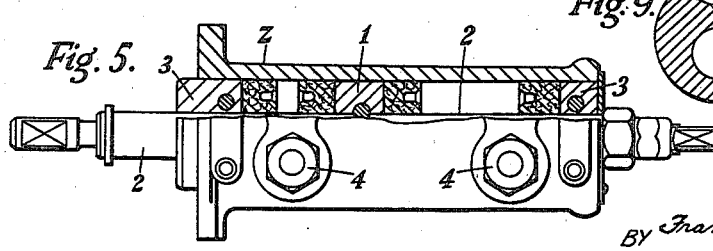
INVENTOR,
BY Francis V. Brown
Sommers+Young,
ATTORNEYS Patented Jan. 12, 1943

2,308,048

UNITED STATES PATENT OFFICE 2,308,048

REMOTE CONTROL SYSTEM

Francis Victor Brown, Edgbaston, Birmingham, England

Application October 2, 1941, Serial No. 413,385
In Great Britain July 3, 1940

16 Claims. (Cl. 60—54.5)

This invention relates to improvements in and connected with remote control systems, wherein either a hydraulic or a mechanical transmission is used between the master control and the sub-control unit or motor unit.

Heretofore the control of devices, mechanical or otherwise in which it has been desired to impart a stepless movement from a remote controlling position has only been possible generally within a wide margin of the desired position owing to a number of disadvantages. Controls coupled mechanically are liable to variation in synchronism between the controlled and controlling ends, or in other words misplacement of the controlled item in relation to its controlling device. For the most part, this arises from variation of the surrounding temperature causing the transmission means to change length in relation to the members or operative surfaces of the controlled and controlling devices. Controls effecting electrical coupling do not suffer such considerable disadvantage if the said control is required only to be positioned at certain selected and prepared positions. External energy supply is however required, and this may not be available or desirable and in any case mitigates against simplicity. Many hydraulic controls of existing or known types do not provide compensation for change of volume under surrounding temperature variation as affecting the transmitting fluid. In this respect they retain all the disadvantages of mechanical transmissions. Where in known types compensation for change in volume of transmitting fluid arising from surrounding temperature variation has been provided for, as far as is known it has not been found possible to effect this with non-misplacement as between the controlled and controlling elements. Because of this, and to ensure knowledge of the exact position occupied by the remote control device, resort has had to be had to repeaters with the attendant disadvantages occasioned by such usage.

Simultaneously, mechanical control devices invariably have a low efficiency in transmission of effort and known types of hydraulic control devices do not achieve the optimum efficiency of hydraulic operation owing to the detrimental effect on efficiency of the mechanism embodied within the controls to effect the measure of compensation for change of volume, under surrounding temperature variation, of the transmitting fluid.

In hydraulic systems working on the closed circuit principle, derangement has been liable to occur owing to expansion and contraction of the fluid medium employed, particularly when a non-freezing liquid had to be adopted in view of the extensive range of temperature variation to which the apparatus must be subjected in its working conditions. It has been found that the rate of expansion is variable with the same change of temperature in different parts of the range. For example, the expansion increases with increase of temperature at a greater rate than in ratio would give a straight line function. Moreover, it has been found that over a range of from −40° C. to +60° C. a non-freezing liquid may increase in volume by as much as one-tenth or more of its original volume. Such variation of volume must be accurately compensated for if distant hydraulic control is to be adopted with practical success. Extensive temperature variation is encountered on aircraft and the present improvements are particularly intended for application to controls on aircraft. However, they are also applicable to other controls, as for example those used on marine craft, railway vehicles, permanent way apparatus, industrial plant, and so on.

The control of aircraft primary services, in particular, requires to be effected at the maximum obtainable synchronism between controlling and controlled ends over a very wide temperature range, with the least loss in transmission such that as large a percentage as possible of the applied energy is available at the controlled end without departing from simplicity of construction with attendant advantages in reliability and without as far as possible an external supply of energy. Similar requirements with varying degrees of importance are attached to gun-fire control, control of essential services in marine vehicles, control of essential services in coupled rail-road Diesel-engined rail cars, and Diesel-engined rail cars and trailers, and control in many industrial applications. Amongst the latter, the precision control of machine tool feeds, tool and work positions, high-speed rotating and reciprocating machinery, and remote control of dampers and ventilation devices and recording devices are typical.

According to this invention, variations in volume or length of the transmission in a remote control system are compensated by the aid of a mechanical linkage comprising oppositely disposed eccentrics having their straps coupled with a device constrained to move in one given direction only, the said eccentrics being normally free to adjust themselves revolubly simultaneously under the influence of the said variations but constituting with their coupled straps a locked mechanism when the transmission is operatively stressed. This mechanical linkage is used advantageously as part of the master control or controlling unit, and in one practical construction the impelling devices, such as pistons, of the master unit are connected with their operating device, such as a hand lever by means of the said mechanical linkage. The latter, on the one hand, permits the pistons to adjust themselves in relation to the hand lever to compensate for expansion or contraction in the transmission but on the other hand preserves at all times an operative connection such that an operative movement of the hand lever in all working conditions, produces instant operation of the pistons. Two pistons of a master control unit may be self-adjusting under the opposed influences of the fluid pressure and springs and, through rack and pinion mechanism, may adjust respective eccentric devices in opposite directions around a common axis. The straps of the eccentrics may be connected with laterally spaced pivots on a crosshead which is restrained to slide relatively to the operating hand lever as by having a stem which is slidable axially in a bore in the said hand lever. By this means, resulting from expansion or contraction of the transmitting medium, self-adjustment of the pistons simultaneously and in one and the same direction causes rotation of the eccentrics with resultant straight line movement of the crosshead in relation to the hand lever. Angular movement of the hand lever compels the eccentrics to turn the pinions which drive the racks and the pistons in appropriate directions for the hydraulic transmission of the control operation.

According to a further feature of the invention, a trip device is provided for enabling the eccentrics to be automatically positioned to a setting which will cause the operating means or hand lever, to have an angular setting accurately corresponding with the instant position of the counter part lever or control rod of the subcontrol or motor unit or units.

Yet another feature of the invention is the provision of self-acting means for enabling the impelling means or pistons to adjust themselves to compensate for any loss by leakage of the transmitting fluid.

In order to enable the invention to be readily understood reference is made to the accompanying drawings, wherein—

Figure 3 is an elevation illustrating a charging connection for enabling a hydraulic master and motor unit system to be charged with liquid.

Figure 3A is an end elevation of a motor unit to be operated by the master control, the view also including a junction piece for connecting up the hydraulic tubing with the motor unit.

Figure 4 is a transverse vertical section partly in elevation of the charging attachment seen in Figure 3.

Figure 5 is a side elevation partly in longitudinal section of the motor unit seen in Figure 3A.

Figures 6 and 7 are sectional end elevations illustrating the operating lever and mechanical linkage for the master control of Figures 1 and 2, Woodruff keys in the sections being shown out of true position for purposes of illustration.

Figures 8 and 9 are detail views illustrating the eccentric devices of the mechanical linkage in Figures 6 and 7.

Figure 1:
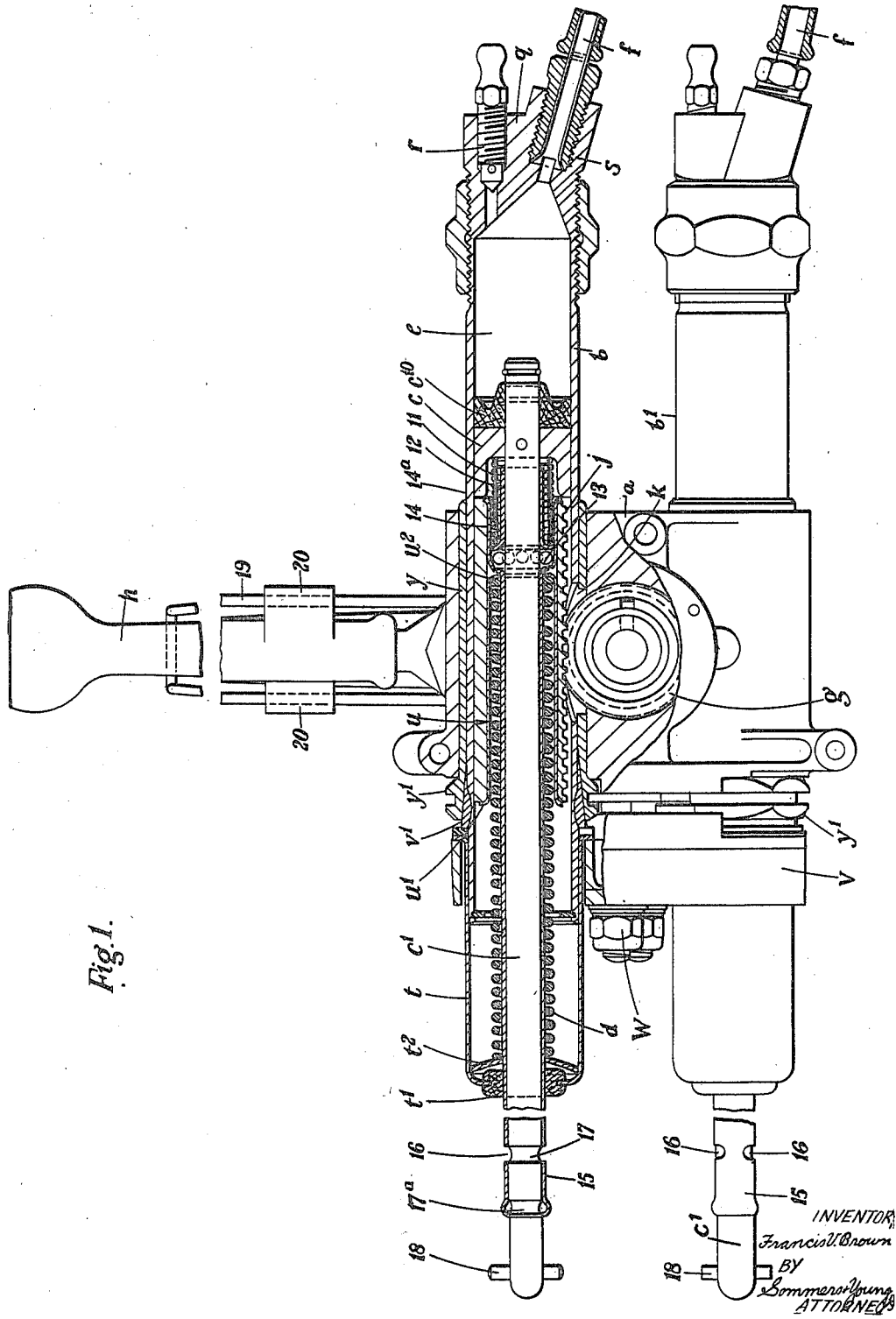
Figure 1 is a side elevation partly in longitudinal section showing the present improvements as applied to a hydraulic master control unit, the hand lever or control being shown in mid-position.
Figure 2:
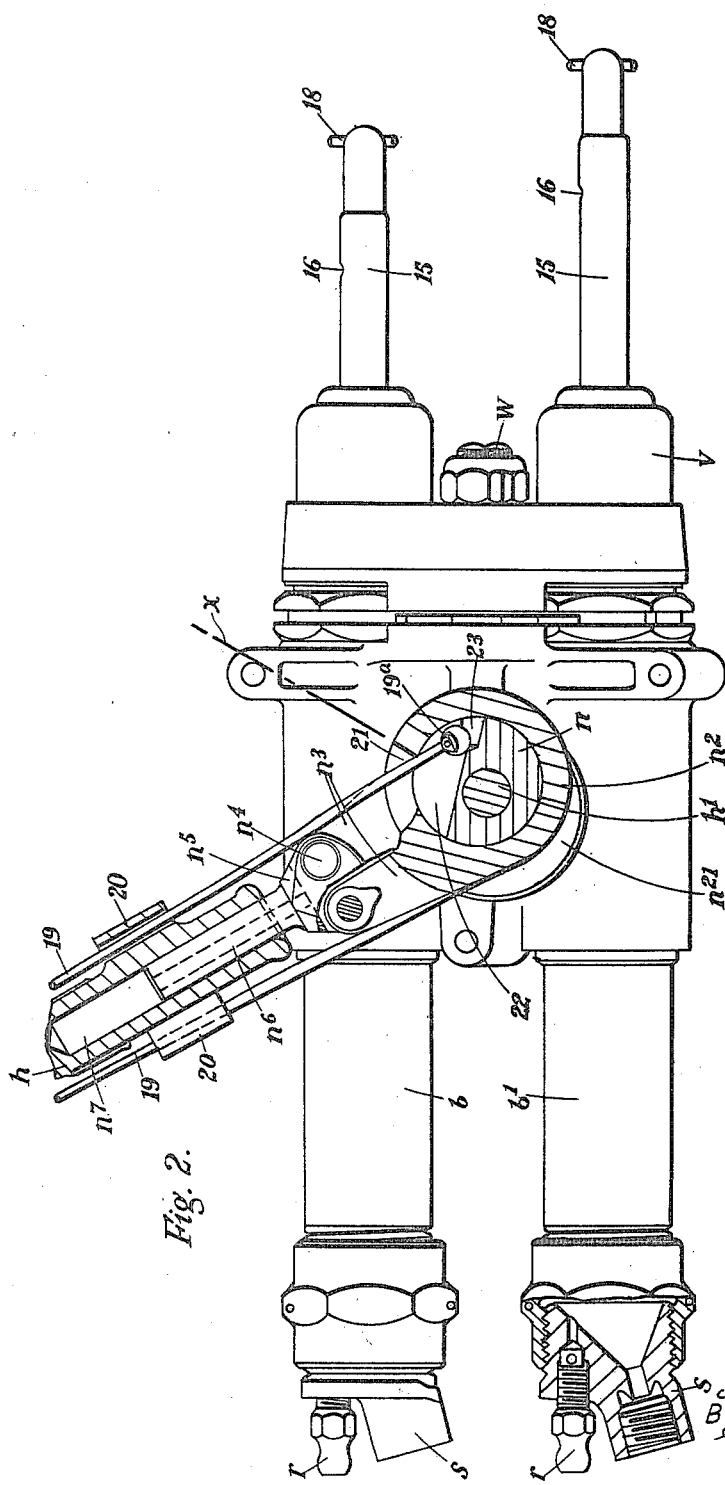
Figure 2 is a side elevation showing in section the mechanical linkage of these improvements as embodied in the hand lever which operates the master control, the said hand lever being shown in this figure in its normal position at one end of its range of movement.

Referring to Figures 1 and 2, there are two hydraulic cylinders $b$ $b^1$ supported at different levels in a body $a$ and each contains a piston $c$, Figure 1, which is urged in one direction by a spring $d$ to maintain pressure in the cylinder spaces $e$ and in the hydraulic tubing $f$ connecting this master control with a slave unit as hereinafter described. The pistons in the two cylinders $b$ $b^1$, in the usual manner, are to be moved simultaneously in opposite directions, so that liquid is forced by one piston $c$ to one side of the piston of the motor unit at the same time that an equal volume of liquid from the opposite side of the piston of the motor unit is discharged into the cylinder enclosing the other piston $c$. This is effected by gears, indicated generally at $g$, which are operated by the hand lever $h$. The piston $c$ in the upper cylinder is associated with a tubular rack $j$ presenting downwardly directed teeth in mesh with one of the gear wheels through an opening $k$ in the cylinder, whereas the piston in the lower cylinder is associated with a similar tubular rack presenting upwardly directed teeth in mesh with a gear through an opening in the cylinder $b^1$. By swinging the hand lever $h$ in one direction or the other, the gears $g$ are turned in that direction, but the racks and their respective pistons are driven in opposite directions to one another, as will be readily understood.

The mechanical linkage of this invention, operating between the hand lever and the rack and pinion gearing will now be described with reference to Figures 1, 2 and 6 to 9. As will be seen from Figures 6 and 7, the cylinders $b$ $b^1$ are not supported by the body $a$ directly one above the other in the same vertical plane but are a little offset to respective sides of a vertical plane. The body or holder $a$ which supports the cylinders $b$ $b^1$ approximately at the middle part of their length, is formed with a transverse bore $l$ which has suitably disposed openings at about diametrically opposite points for exposing the teeth of the tubular racks $j$ $j^1$. As seen in Figures 6 and 7, the tubular rack $j$ with its downwardly presented teeth is laterally displaced along and within the bore $l$ relatively to the tubular rack $j^1$ with its upwardly presented teeth. The hand lever $h$ is keyed to a spindle $h^1$ upon which are passed two concentric hollow shafts $m$ $m^1$ terminating at one end in respective eccentrics $n$ $n^1$. These shafts $h^1$ $m$ $m^1$ are inserted into the bore $l$ so that the two eccentrics $n$ $n^1$ lie together between the hub $h^2$ of the hand lever $h$ and one end of the bore $l$, the eccentrics being separated from one another and from the hub $h^2$ and body $a$ by suitable spacing washers. The outer one $m^1$ of the concentric shafts has keyed to it at $o^1$ a pinion ring $p^1$ the teeth of which come into mesh with one of the racks, for example the lower rack $j^1$. The inner hollow shaft $m$ is keyed by a radially deeper key $o$ with a second pinion ring $p$ alongside the pinion ring $p^1$, the teeth of the second pinion ring $p$ coming into mesh with the rack $j$. Referring to Figure 2, it will be seen that the lobe of one eccentric $n$ is set to the right of a line passing through the centre of the hand lever $h$ and the centre of the spindle $h^1$ and that the lobe of the other eccentric $n^1$ is set similarly but to the opposite side of the said line. The eccentric $n^1$ is hidden in Figure 2 but its strap $n^{21}$ shows its setting. The straps $n^2$ and $n^{21}$ of the eccentrics are formed with short rods or arms $n^3$ which are connected with side-by-side pivots $n^4$ on an inverted T-shaped cross head $n^5$ the stem $n^6$ of which is slidably received in a socket $n^7$ formed axially in the hand lever $h$.

The effect in operation of the mechanical linkage constituted by this eccentric mechanism will now be described. Assuming that the system is charged with liquid, if expansion of the liquid should occur due to rise in temperature, both pistons $c$ will be forced simultaneously in the same direction in their cylinders $b$ $b^1$ against the resistance of their respective springs $d$, Figure 1. As the rack $j$ meshes on the top of its pinion ring $p$ and the rack $j^1$ meshes beneath its pinion ring $p^1$, see Figures 6 and 7, the two eccentrics $n$ and $n^1$ are turned oppositely. Such turning of the eccentrics is not resisted, the arms $n^3$ of the straps $n^2$ $n^{21}$ being free to swing about their pivots $n^4$ so that all that results is a slight axial movement of the cross head stem $n^6$ within the socket $n^7$ of the hand lever $h$. If contraction of the liquid occurs, as with a fall in temperature, the springs $d$ force the pistons $c$ reversely and the pinion rings $p$ $p^1$ and eccentrics $n$ $n^1$ are turned oppositely to the direction in which they were turned when expansion took place. When the motor unit is to be operated, the hand lever $h$ is grasped and moved through an arc, as for example through the full range of movement from the full line position seen in Figure 2 to the position indicated by chain line $x$ in that figure. During this operation, the hand lever $h$, cross head $n^5$, eccentric straps $n^2$ $n^{21}$ and eccentrics $n$ $n^1$ become a locked coupling mechanism, this being due to the disposition of the eccentrics and the fact that the cross head $n^5$ $n^6$ is restrained by its socket $n^7$ so that it can perform only axial movement. Consequently, the locked mechanism causes the pinion rings $p$ $p^1$ to turn in one and the same direction and to drive the racks $j$ $j^1$ in opposite directions. Thus, one piston $c$ is forced to make a delivery stroke to the motor unit, the other piston receding before the return flow from such unit. The coupling is only unlocked, as it were, when the two pistons $c$ move simultaneously in one and the same direction, as when affected by expansion or contraction of the liquid in the manner above described.

It will be apparent that the mechanical linkage hereinbefore described would operate similarly and with the same effect if the gearing were adapted for operating say push and pull rods, or pull-in and pay-out wires, in control systems wherein a mechanical transmission is more convenient for use than a hydraulic transmission. In such systems expansion or contraction in the transmission means, such as the rods or wires above mentioned, would have the same effect as expansion or contraction of the liquid in the hydraulic system hereinbefore described. In all cases, the mechanical linkage, whilst permitting of the compensatory actions described, preserves at all times an operative connection such that an operative movement of the hand lever $h$ in all working conditions produces instant operation of the pistons $c$ or other members actuating the transmission.

Features of the hydraulic apparatus illustrated in the drawings will now be described in detail. Referring to Figure 1, each piston $c$ comprises a cup packing $c^{10}$ facing the closed or rear end of its respective cylinder, this end being closed by a cover or head $q$ comprising a bleed hole device controlled by a screw $r$ and a socket formation $s$ for the connection of the appropriate transmitting duct or tubing $f$. The rod $c^1$ of each piston $c$ extends through fittings on the open or front end of its respective cylinder. For example, this end may be fitted with a tubular cover $t$ fitted with a grommet or packing $t^1$ for the rod $c^1$ which is extended through it. In each cylinder, the tubular rack $j$ or $j^1$ abuts with one end against its piston $c$ and at its opposite end against an outwardly turned flange $u^1$ formed on one end of a tubular spring casing $u$ that extends through the greater part of the tubular rack $j$ or $j^1$. The spring $d$ for each piston $c$ is a relatively long one and abuts at one end against an inwardly turned flange $u^2$ of the spring casing $u$ and at the other end against a saddle washer $t^2$ inserted within the tubular cover $t$. When the cylinders $bb^1$ have been inserted in the body or holder $a$, split cotters $v^1$ are applied for fixing them and they are finally secured by a clamp yoke $v$ fastened by nuts $w$.

In order to ensure perfect meshing between the racks $jj^1$ and respective pinions $pp^1$, the cylinders $bb^1$ may be mounted in the body or holder $a$ by means of eccentric sleeve devices $y$. Accuracy of meshing is obtained by rotatably adjusting the sleeve devices $y$ between suitable limit stops by the aid of hexagonal heads $y^1$ on such sleeves.

The hydraulic tubes $ff$ are carried from the master control cylinders $bb^1$, Figures 1 and 2, to a distant motor unit such as that seen in Figures 3a and 5. This unit comprises a cylinder $z$ in which works a piston 1 fixed to a rod 2 extending through both end covers 3 of the cylinder $z$, and having its end or ends operatively connected with the part to be controlled. The tubes $ff$ are connected with the cylinder $z$ by union nuts 4, 4 so as to be in communication with respective sides of the piston 1. On the cylinder $z$, and for the space on each side of the piston, there is a closable bleed-hole or air escape device 5. The tubes $ff$ are preferably wrapped together so as to extend as a single flex from the master control to the motor unit $z$. At a convenient point in the length of tubing there is introduced a charging connection 6, Figures 3 and 4. For joining the tubes $ff$ up to any piece of apparatus, connectors 7, Figures 3 and 3a are used. Each of these is a tubular Y piece, the wrapped tubes being inserted into the stem of the Y and the separated tube ends being taken through respective branches of the Y and connected up with the piece of apparatus by the union nuts 4. The charging connection 6 comprises a downwardly directed charging nipple 8, which normally may be protected by a cap 8ᵃ as seen in Figure 4, this cap 8ᵃ being shown detached in Figure 3 to make the nipple 8 accessible for the attachment of a charging device which may be a device of the grease gun variety. Liquid forced in through the nipple 8 ascends into a chest or gallery from which it escapes past two-screw down needle valves 9, these latter having been unscrewed from their seats just prior to the charging operation. The liquid thus passed flows through the short port 10 and the long port 10a simultaneously into respective tubes $ff$. When the charging of the system has been completed, the valves 9 are of course, tightly screwed down on to their seats. During a charging operation, the bleed hole devices $r$ on the cylinders $bb^1$ and those marked 5 on the motor unit, are also opened for the escape of trapped air and are reclosed when air ceases to escape. In the initial charging of the system, the pistons $c$ are forced back by the pressure of the liquid forced in and thus stress their springs d.

It is advisable or necessary to make provision for the possibility that owing to slight leakage from a tube f, the liquid may recede from one piston c and not from the other. It is also necessary to make provision for the possibility that the tubes ff may not contain similar volumes of liquid and accordingly under the effect of change of temperature to a lower than normal value the volume of liquid in one tube f will contract more or less than the volume of liquid in the other tube f causing the liquid to recede from one piston c and not the other. If leakage or change of volumetric capacity caused recession of liquid from both pistons simultaneously and equally, this would be like the effect of contraction and would be taken care of in the manner hereinbefore described. For the purpose in view, a secondary spring 11, Figure 1, is inserted behind each piston c and constantly tends to separate such piston from its tubular rack j or j¹. The spring 11 presses with one end against the piston c and with the other end against an end flange of a sleeve 12 slidable on the piston rod c¹ and encircled by the spring 11. The end flange of the sleeve 12 presses against a set of balls 13 and tightly engages the latter in the coned end of a cylindrical shell or thimble 14. The latter at its opposite end has an outwardly turned flange 14ª which abuts against the end of the tubular rack j or j¹ as the case may be. The balls 13 and coned end of the thimble 14 constitute a ball locking device adapted for permitting a piston c to move away from its rack j or j¹ but preventing its re-approach. Thus, if liquid recedes from one piston only, the secondary spring 11 of that piston forces it away from its rack j or j¹ so that it maintains contact with and pressure on the liquid, the ball locking device freely permitting this movement. As soon as positive pressure is applied to the piston, however, the ball locking device jams and prevents the piston from re-approaching its rack. Unless subsequent further leakage or change of volumetric capacity takes place, the piston will maintain its new position relatively to the rack owing to the locking action described. A so-called lifter tube 15 is fitted around the piston rod c¹ and so that its inner flanged end comes against the race or cage of the balls 13 of the locking device. The outer end of the lifter tube 15 extends with the piston rod c¹ through the packing t¹ to the exterior. When the system is recharged to make good deficiency due to leakage, the lifter tube 15 is pushed in to hold the balls 13 out of locking position, and thereby to permit a piston c to re-approach its rack j or j¹ and to come into directly abutting relation therewith, which is the condition of the parts seen in Figure 1.

The piston rods c¹ extend outwardly from the tubular covers t at all times as also do the lifter tubes 15 which are thus always accessible for use as will be understood from Figures 1 and 2. The piston rods c¹ extend through the lifter tubes 15 and project slightly at the ends thereof to serve as indicators. Each lifter tube near its end may be pierced with small windows 16. The part of the piston rod c¹ which would be normally adjacent to the windows 16 is indented with two grooves 17, 17ª. Figure 1 coloured green and red respectively. The presence of one or other of the colours in the windows 16 will disclose the state of abutment or otherwise of the piston against its rack, thereby giving an indication of whether or not a deficiency has to be made good to compensate for leakage, or whether or not the unit is out of synchronism. A cross pin 18 in the end of each piston rod c¹ acts as a limit stop by coming against the end of a respective sleeve 15 to restrict the travel of the corresponding piston c away from abutting relation with its rack j or j¹ under the influence of its secondary spring 11.

It will be appreciated that like operative parts of the master control and motor unit must occupy corresponding positions at any moment. Thus, the hand lever h of the master control must be right back when the corresponding element of the motor unit is also right back. As the tubes ff may not contain similar volumes of liquid it follows that under influence of change of temperature the volumes present will not expand or contract by equal amounts. The mechanical compensating linkage as hereinbefore described will only operate under the influence of a like change of volumes in the tubes ff. In those instances wherein the liquid volumes of the tubes are not similar the difference in expanded volume will influence the piston in the motor unit, moving this piston until a condition of balance obtains and thereby causing lack of synchronism in the instant position of like operating parts of the controlling and motor units. Adjusting the master control lever h to correspond with the motor unit elements is referred to as synchronizing these parts. To accomplish this with accuracy, the hand lever h is fitted with a longitudinally extending inverted U-loop of wire 19. The limbs of this loop are movable in guides 20 on the hand lever h and the free ends thereof are upset to form spherical knobs 19ª, Figure 2. This device 19 is referred to as a trip wire. The eccentric straps n²n²¹ are slotted with keyhole slots at 21, Figures 2 and 6, to allow the limbs 19 to pass through and the eccentrics nn¹ are formed with a deep slot 22, Figures 2, 8 and 9 and with a hole 23 of greater diameter than the width of the slot 22, the hole 23 being drilled non-radially from the periphery of the eccentric and intersecting the slot. At the point where the end of the hole 23 is intersected by the slot 22 shoulders are formed which are suitable for engagement with the spherical enlargements 19ª on the end of the wire 19 to be engaged therewith. As will be apparent, the eye part of each keyhole slot 21 and the hole 23 enable the spherical enlargements 19ª to be inserted into the eccentrics and engaged with the shoulders aforesaid, the slots 21 and 22 thereafter permitting of any necessary angular movements of the wire limbs in relation to the eccentrics and eccentric straps.

In operation, the action of lifting the trip wire 19 causes the knobbed ends 19ª to react against the shoulders at the bottom of the cavities 23, simultaneously in the two eccentrics. Thus, the upward pull of the trip wire 19 rotates the eccentrics nn¹ in opposite directions around the common axis, as will be readily understood from Figure 2, decreasing the included angle between their maximum eccentricities.

To consider how this affects synchronism between the master unit and the sub-control or motor unit it must be remembered that the mechanical leverage of the control can only vary when both pistons c move in unison in response to expansion or contraction of the fluid transmitting medium. If the piston 1 in the motor unit z is out of phase with the corresponding piston of the master unit, it follows that one or other of the pistons c, provided with the means described to compensate for pipe-line leakage, has moved forward from its abutment on its rack sleeve j or j¹, and that both pistons of the master unit have receded from their true position by half the amount that the piston in question is away from its abutment. Thus at normal temperatures there exists a condition of out-of-phase in which the master unit hand lever is in the correct phase position.

To remedy the discrepancy, instead of bringing the motor unit piston into correct position the hand lever $h$ of the master unit is adjusted to line up with the instant motor unit piston position. For this purpose, the lifter tube 15 of the cylinder $b$ or $b^1$ in which the piston $c$ is away from its abutment is pressed in to free the ball lock 13, and simultaneously the hand lever $h$ is moved in the appropriate direction and the trip wire 19 lifted. Lifting the trip wire 19 rotates the eccentrics $nn^1$ contrariwise about their common centre as previously described and this in turn brings both pistons $c$ forward. This, together with maintaining the ball locking of the piston inoperative and movement of the hand lever $h$ in the appropriate direction averages out the master pistons' discrepancies, and when the piston $c$ in error is again on its abutment face and the trip wire can no longer be lifted, or when the hand lever $h$ has been adjusted to the appropriate position, synchronism obtains.

The spring-urged piston devices and the mechanical linkage need not be embodied in a master control but may be used purely as a compensating unit.

I claim:

1. In a remote control system having a transmitting medium in which vibrations occur from expansions and contractions thereof, mechanical linkage for compensating said vibrations, comprising a rectilineal guide, a crosshead constrained to move in said guide, oppositely disposed eccentrics revoluble about a common axis, and eccentric straps encircling said eccentrics and secured in pivotal connection to said crosshead, the said eccentrics being normally free to adjust themselves by simultaneous turning movement under the influence of the said variations but constituting together with their straps, crosshead, and rectilineal guide, a locked mechanism when the transmission is operatively stressed.

2. In a remote control system having a transmission means, two spring loaded sliding members in operative connection with said transmission means and gearing between the said members, said gearing comprising oppositely disposed eccentrics revoluble about a common axis, and eccentric straps encircling said eccentrics and secured in pivotal connection to a crosshead constrained to move in a rectilineal guide, whereby said gearing permits simultaneous movement of the said spring loaded sliding members in one and the same direction under the influence of variations due to expansion and contraction of the transmission means and acts as an interlock between the said members when the transmission is operatively stressed.

3. In a remote control system of the closed circuit type comprising outward and return transmission leads to and from the master control, the combination of spring loaded sliding members in connection with respective leads, rack and pinion gears in driving connection with respective members, eccentrics of opposite hand in driving connection with respective gears and revoluble about a common axis, eccentric straps encircling said eccentrics, a crosshead, pivotal connections between said straps and said crosshead, and rectilineal guide means operative upon said crosshead.

4. In a remote control system of the closed circuit type in combination a master control handle, a mechanical linkage having oppositely disposed eccentrics revoluble about a common axis, eccentric straps encircling said eccentrics, a rectilineal guide, and a crosshead constrained to move in said guide, said eccentric straps being secured in pivotal connection with said crosshead, the said linkage being self-locking and operative for transmission movements when the said handle is operated and self-adjusting under the effects of expansion or contraction in the leads of the said circuit to compensate such effects.

5. Master control unit for remote control system of the closed circuit hydraulic type comprising in combination spring loaded single acting pistons in cylinders connectable with respective leads of the circuit, a hand control lever, pinion and rack gearing operative between said lever and pistons and adapted for reversely driving said pistons, and a mechanical linkage comprising oppositely disposed eccentrics revoluble about a common axis and encircled by eccentric straps secured in pivotal connection to a crosshead constrained to move in a rectilineal guide, said mechanical linkage being disposed between said lever and said gearing and operative for communicating control movements from the said lever to the said gearing but automatically unlocking when said pistons are simultaneously urged in one and the same direction by internal pressure.

6. Master control unit for a remote control system of the closed circuit hydraulic type comprising in combination, a hand control lever swingable about an axis, two juxtaposed eccentrics revoluble about said axis and disposed with their lobes towards opposite sides of said axis, eccentric straps, a cross head slidably guided in said lever, pivotal connections between said straps and said cross-head, pinions connected with respective eccentrics, racks reversely meshing with said pinions, spring loaded pistons in operative connection with respective racks and cylinders enclosing said pistons and adapted for connection with respective leads of the hydraulic circuit.

7. Master control unit for a remote control system of the closed circuit hydraulic type comprising in combination, superposed offset cylinders adapted for connection with respective leads of the circuit, spring loaded pistons in said cylinders, juxtaposed pinions between said cylinders, racks in operative connection with respective pistons and having their toothed edges oppositely disposed and meshed with respective pinions, coaxial eccentrics connected with respective pinions and disposed with their lobes towards opposite sides of the axis of revolution, straps encircling said eccentrics, a cross head, pivotal connections between said straps and said crosshead, a hand control lever swingable about the axis of said pinions and eccentrics, and a rectilineal guide in said lever for said crosshead.

8. A master control unit for a remote control system, comprising spring loaded slidable power members movable in opposite directions for operating the distant motor unit and self-adjusting by reason of their spring loadings to compensate for expansions or contractions in the transmission, a hand lever for operating said power members, and a mechanical linkage comprising oppositely disposed eccentrics revoluble about a common axis and encircled by eccentric straps secured in pivotal connection to a crosshead constrained to move in a rectilineal guide, said mechanical linkage being disposed between said hand lever and said power members and adapted for permitting simultaneous self-adjustment of the latter while providing for the instant driving of said power members when the hand lever is operated.

9. A master control unit for a remote control system comprising spring loaded pistons, racks abutting against the pistons for operating said pistons, pinions with which said racks are meshed so that simultaneous movement of the pistons in one and the same direction drives the pinions reversely, coaxial eccentrics connected with respective pinions and set with their lobes similarly but oppositely disposed, eccentric straps, a crosshead having pivotal connection with the eccentric straps, and a hand lever pivotable about the axis of revolution of the eccentrics and having rectilineal guiding engagement with the crosshead.

10. A master control unit for a remote control system, as claimed in claim 9, wherein secondary springs are interposed between the pistons and respective racks and a one-way clutch device, such as a ball clutch, is engaged between each piston and its rack, whereby each piston individually can follow up recession of liquid due to leakage or change of volumetric capacity and retain its new position in relation to its rack.

11. A master control unit for a remote control system as claimed in claim 9, further comprising secondary springs interposed between the pistons and respective racks, a one-way ball clutch device engaged between each piston and its rack whereby each piston individually can follow up recession of liquid due to leakage or change of volumetric capacity and retain its new position in relation to its rack, and a lifter tube releasing means on each piston rod, said releasing means being operative for releasing the one-way clutch device when a piston is to be returned to normal abutting relation with its respective rack.

12. A master control unit for a remote control system as claimed in claim 9, further comprising secondary springs interposed between the pistons and respective racks, a one-way ball clutch device engaged between each piston and its rack whereby each piston individually can follow up recession of liquid due to leakage or change of volumetric capacity and retain its new position in relation to its rack, a lifter tube on each piston rod said lifter tube being operative longitudinally for releasing the one-way clutch device when a piston is to be returned to normal abutting relation with its respective rack, and extensions on the piston rods adapted to cooperate with the lifter tubes for indicating movements of the pistons in relation to respective racks.

13. A master control unit for a remote control system of the closed circuit type wherein spring loaded pistons are reversely geared by rack and pinion gearing with the hand control and a mechanical linkage is adapted for permitting said pistons to move simultaneously with change of volume in the circuit whilst ensuring instant drive transmission to said pistons when the hand control is exercised, the combination of auxiliary springs constantly tending to separate the pistons from respective racks, ball clutch devices operative for permitting such separation but for preventing re-approach, manually operated ball clutch release means, and manually operated trip means operative for re-setting said mechanical linkage for the purpose set forth.

14. A master control unit for a remote control system of the closed circuit type comprising in combination pistons operative upon respective circuit leads, spring-loaded racks operative against said pistons, auxiliary springs constantly tending to separate said pistons from respective racks, ball clutch devices operative for permitting such separation but preventing re-approach, manually operable ball clutch release means, coaxial pinions in reverse driving mesh with said racks, coaxial eccentrics connected with respective pinions and having their lobes disposed towards opposite sides of the axis of revolution, eccentric straps, a cross head, pivotal connections between said straps and said cross head, a hand control lever swingable about said axis of revolution, rectilineal guiding means operative between said cross head and said lever, and a trip device slidably mounted on said lever and in operative engagement with said eccentrics for reversely revolving the latter simultaneously for the purpose set forth.

15. A master control unit in accordance with claim 14, wherein the clutch release means take the form of lifter tubes slidable along the piston rods, said tubes and rods being extended and adapted for conjoint service as indicator means for the purpose set forth.

16. A master control unit for a remote control system of the closed circuit type comprising in combination a holder, two cylinders superposedly mounted therein and adapted for connection with respective circuit leads, pistons in said cylinders, tubular racks surrounding the piston rods, springs operative against said racks and tending constantly to maintain abutting relation between said racks and said pistons, coaxial pinions mounted between said cylinders and in mesh with respective racks, eccentric sleeves surrounding said cylinders and revolubly adjustable for correctly meshing said racks with said pinions, a hand control lever and a mechanical linkage operative between said lever and said pinions said linkage being adapted for instant transmission of drive from said lever to said pinions but automatically permitting simultaneous reverse revolution of said pinions independently of said lever for the purpose set forth.

FRANCIS VICTOR BROWN.